United States Patent [19]

Lemmens

[11] Patent Number: 4,690,782

[45] Date of Patent: Sep. 1, 1987

[54] PROCESS FOR DECONTAMINATING MATERIALS CONTAMINATED BY RADIOACTIVITY

[76] Inventor: Godfried Lemmens, Leopoldslei 50, 2130 Brasschaat, Belgium

[21] Appl. No.: 847,776

[22] Filed: Apr. 3, 1986

[30] Foreign Application Priority Data

Jan. 30, 1986 [BE] Belgium .............................. 2/60917

[51] Int. Cl.$^4$ .......................... G21F 9/00; C23G 1/02
[52] U.S. Cl. .................... 252/626; 376/310; 134/3
[58] Field of Search ................ 252/626, 631; 376/309, 376/310; 423/20; 134/3

[56] References Cited

U.S. PATENT DOCUMENTS

| | | | |
|---|---|---|---|
| 3,496,017 | 2/1970 | Weed | 376/310 X |
| 3,615,817 | 10/1971 | Jordan | 134/3 |
| 3,778,309 | 12/1973 | Jackson | 134/3 X |
| 4,481,040 | 11/1984 | Brookes et al. | 252/626 X |

FOREIGN PATENT DOCUMENTS

| | | | |
|---|---|---|---|
| 71336 | 2/1983 | European Pat. Off. | 252/626 |
| 2613351 | 10/1977 | Fed. Rep. of Germany | 252/626 |
| 73777 | 5/1983 | Japan | 134/3 |

*Primary Examiner*—John F. Terapane
*Assistant Examiner*—John S. Maples
*Attorney, Agent, or Firm*—Schwartz, Jeffery, Schwaab, Mack, Blumenthal & Evans

[57] ABSTRACT

The process according to the present invention mainly consists in successively bringing the surface of the contaminated materials into contact with a solution of sodium carbonate for some time, bringing the surface of the contaminated materials into contact with a solution of diluted nitric acid, while potassium permanganate is being added, bringing the contaminated materials into contact with a solution of oxalic acid (COOH—COOH.2H$_2$O), and finally rinsing and drying said materials.

14 Claims, No Drawings

PROCESS FOR DECONTAMINATING MATERIALS CONTAMINATED BY RADIOACTIVITY

BACKGROUND

The present invention relates to a process for decontaminating materials contaminated by radioactivity, in partiuclar to a process for separating and eliminating radioactive materials from the materials contaminated by radioactivity. Particularly, the process according to the invention has the purpose of removing a so-called fixed contamination that is produced on the surfaces of materials after having been in contact with radioactive materials.

It is a known fact that it is very difficult to separate optimally radioactive particles of materials from the materials contaminated by same. The present invention therefore provides an original process whereby, by means of a chemical decontamination an effective separation and an effective removal of radioactive materials and material surfaces can be achieved without requiring complicated and difficult techniques.

SUMMARY OF THE INVENTION

Therefore, the process, according to the present invention mainly consists in that the surface of the contaminated materials is successively brought into contact with a solution of sodium carbonate; the surface is brought into contact for some time with heated diluted nitric acid, whilst potassium permanganate is added thereto; the contaminated materials are kept in contact at 70° C. with a solution of oxalic acid (COOH—COOH.2 $H_2O$); and the so treated materials are finally rinsed and dried.

DETAILED DESCRIPTION OF THE INVENTION

In order to better show the characteristics of the invention, hereafter, as an example without any restrictive character, the aforesaid process is described more in detail.

According to a first step of the invention the contaminated materials or at least their surfaces to be treated are brought into contact with a solution of sodium carbonate. Preferably, the sodium carbonate is first dissolved by heating, in such a way that a strong alkaline solution is obtained. Boron, which is usually present on the contaminated surface and makes the removal of the radioactive particles more difficult, is mainly removed through the contact between the heated solution and the contaminated surface.

The temperature of the sodium carbonate is preferably at least 80° C. The time during which the aforesaid contact takes place is a function of the importance of the surface to be treated and of the kind and force of the radioactive contamination. In most cases a duration of contact of 5 to 30 minutes is sufficient.

The second step of the invention consists in that, after the first step has been completed, the contaminated materials are brought into contact with diluted nitric acid to which potassium permanganate is added. Therefore, one starts by heating the diluted nitric acid. Thereafter the materials treated according to the first step are brought into contact with this diluted nitric acid, then potassium permanganate, preferably in the form of granules, is added to the nitric acid. In order to obtain an optimal reaction between both products, the nitric acid is heated to a temperature of 70° C., whilst it is kept in constant circulation during the addition of potassium permanganate. By this second step of the invention one obtains that permanganate ions ($MnO_4^-$) fix themselves on the contaminated particles, which can be determined through the fact that the surfaces of the treated materials show a black colour.

The amount of potassium permanganate added to the diluted nitric acid and the time during which, in this second step, the materials to be treated remain in contact with the products concerned are a function of the size and the surface to be treated and of the kind and intensity of the radioactive contamination. Preferably, however, the potassium permanganate is added in the ratio of 1 kg per 1000 liters of diluted nitric acid.

The third step of the invention consists in that, after the second step has been completed, the contaminated materials are brought into contact with the oxalic acid solution. The contact preferably takes place at an increased temperature, which offers the advantage that the reaction speed of the process that takes place in the course of this step increases considerably. During this third step of the process according to the invention the permanganate ions and the contaminating radioactive particles of material become separated from the surface of the materials to be treated. The oxalic acid solution is strong enough that the material to be treated appears as a grayish-white surface, indicating that no traces of permanganate remain. Preferably, however, a concentration is used which is chosen such that by the conjunction of equal amounts of oxalic acid solution, on the one hand, and of the mixture as described in the second step, on the other hand, i.e. the mixture of diluted nitric acid and potassium permanganate, a neutral product is obtained.

According to the fourth and last step of the invention, the treated materials are rinsed and dried, the rinsing step being carried out by means of demineralized water.

If, however, before rinsing one observes that the contamination is still too important, then, still according to the invention, said second and third steps of the process should be repeated at least once with increasing amounts of potassium permanganate and oxalic acid. When the second and third steps of the process are repeated, at least the concentration of potassium permanganate is increased.

Bringing the contaminated materials into contact with the aforesaid solution preferably takes place by immersion. The process according to the invention therefore, is especially convenient for the decontamination of relatively small tools and elements, as exist in laboratories. This, however, does not exclude that the invention is also applicable to larger contaminated objects, whereas the contact with the various products can be obtained through humidification or otherwise of the surfaces to be treated.

Also according to the invention, if desired, the various residual products can be evacuated in one batch operation. By mixing these products in a correct mixing ratio a neutral (pH=7) mixture is obtained, which offers the advantage that it may be treated in the existing circuit of waste water of existing nuclear installations, without thereby incurring the risk of damage, obstruction or other drawbacks.

It is clear that there are many variants for carrying out the above process, whereas various concentrations, mixing proportions and times of contact may be applied, without thereby departing from the scope of the invention.

I claim:

1. A process for decontaminating radioactively contaminated material comprising the steps of:
   (a) successively bringing into contact for a predetermined length of time the surface of the contaminated material with a solution of sodium carbonate,
   (b) bringing the surface of the contaminated material into contact with heated and diluted nitric acid, thereafter potassium permanganate is added thereto,
   (c) bringing the surface of the contaminated material into contact for a predetermined length of time with a solution of oxalic acid (COOH—COOH.2-$H_2O$), and
   (d) finally rinsing and drying the material.

2. The process according to claim 1, wherein the sodium carbonate solution is preheated.

3. The process according to claim 1, comprising a strong alkaline sodium carbonate solution.

4. The process according to claim 1, wherein said predetermined length of time during which the surface of the contaminated material is brought into contact with the sodium carbonate solution is between about 5 and 30 minutes.

5. The process according to claim 1, wherein the diluted nitric acid is heated to a temperature of approximately 70° C.

6. The process according to claim 1, wherein the potassium permanganate is added in the ratio of 1 kg per 1000 liters of dilute nitric acid.

7. The process according to claim 1, wherein the potassium permanganate is added to the diluted nitric acid in the form of granules.

8. The process according to claim 1, wherein said oxalic acid solution is heated.

9. The process according to claim 1, wherein the concentration of the oxalic acid solution is sufficient to remove substantially all traces of permanganate from the contaminated material as indicated by a pure grayish-white appearing metal surface.

10. The process according to claim 1, wherein said step of rinsing the treated material comprises demineralized water.

11. The process according to claim 1, wherein the bringing into contact of the contaminated material with the various solutions comprises immersion.

12. The process according to claim 1, further comprising the step of mixing residual products resulting from the treatment of the contaminated material so as to obtain a mixture having approximately a neutral pH.

13. The process according to claim 1, further comprising the step of repeating steps (b) and (c) at least once.

14. The process according to claim 13, wherein, at least the concentration of potassium permanganate is increased when repeating steps (b) and (c).

* * * * *